UNITED STATES PATENT OFFICE.

ALBERT BUSCH, OF BRUNSWICK, GERMANY, ASSIGNOR TO FIRM OF BAUER & CIE., OF BERLIN, GERMANY.

ALBUMEN PREPARATION FROM ALBUMINOIDS AND SALTS OF GUAIACOL-SULFONIC ACIDS.

979,645.

Specification of Letters Patent.

Patented Dec. 27, 1910.

No Drawing. Application filed December 28, 1909. Serial No. 535,330. (Specimens.)

*To all whom it may concern:*

Be it known that I, ALBERT BUSCH, a subject of the Duke of Brunswick, residing in the city of Brunswick, in the Duchy of Brunswick, German Empire, have invented a certain new and useful Manufacture of Albumen Preparations Soluble in Water from Albuminoids and Salts of the Guaiacol-Sulfonic Acids, of which the following is a specification.

My invention consists in combining the basic soluble salts of the guaiacol-sulfonic-acids directly in a pure concentrated solution with certain albuminoids viz. albuminates, casein of milk or vegetable casein. In this manner the crystallization of the guaiacol-sulfonic-acid-salts is not only avoided, but it is possible to produce an antiphthisic, which contains besides the antiphthisical salts of guaiacol-sulfonic-acids at the same time an excellent food of high nutritive value. Moreover, while the salts, especially the isomeric basic sodium salts of the guaiacol-sulfonic-acids

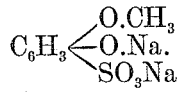

have rather a bitter and alkaline taste, the new composition is quite tasteless and therefore particularly suitable for therapeutic use.

The isomeric guaiacol-sulfonic-acids mentioned above are formed simultaneously by treating guaiacol with concentrated sulfuric acid at temperatures below 100 degrees centigrade (compare Paul, *Berichte der Deutchen Chemischen Gesellschaft* Vol. 39 page 2773). The potassium salts of these acids are the easiest to be obtained, but they are, like all soluble potassium salts, heart poisons. The sodium salts are more suitable, but their crystallization is difficult. By this invention it is possible to obtain a product which contains the difficultly crystallizable sodium salts. The crystallization of the sodium salts is in this manner avoided.

The preparation of the basic sodium salts of the guaiacol-sulfonic-acids may be carried out in the following manner: Guaiacol is sulfonated by means of concentrated sulfuric acid, the mixture is then diluted with ice-water, the excess of free sulfuric acid is removed by adding the exact quantity of barium hydrate or barium carbonate. Then filter and saturate the filtrate with slaked lime, whereby the mixture of basic lime salts is precipitated. This mixture of lime salts is converted into the basic sodium salts of the isomeric guaiacol-sulfonic-acids by boiling them with water and the equivalent quantity of carbonate of soda or sodium hydroxid, filtering off the deposit of carbonate or hydrate of lime and concentrating the filtrate.

The process of manufacturing the albuminoid preparations mentioned above, can be effected in several ways. Good practical results will be obtained from the process described hereafter.

Example 1: 100 parts by weight of albuminous matter, for instance casein of milk are mixed to a paste with a small quantity of cold water. Then 28 parts by weight of a 25% solution of basic sodium salts of guaiacol-acids are added and the mixture is warmed to 40 degrees centigrade. On adding some boiling water say 400 parts, a solution will result which is filtered and evaporated at 30–40 degrees centigrade preferably *in vacuo*. The residue is ground and finely sifted; it constitutes a white, well keeping odorless and tasteless water soluble powder with about 6.5 per cent. of guaiacol-sulfonic-acid salts, absorbing cold water and swelling and dissolving by heat to a milky white liquor.

Example 2: 100 parts by weight of albuminous matter, for instance casein of milk, free from fat and finely sifted, are made into a paste with a mixture of 100 parts by weight of alcohol (92 to 96%) and 100 parts by weight of ether. Then 28 parts by weight of a 25% solution of basic sodium salts of the guaiacol-sulfonic-acids are caused to flow under constant stirring into this mixture. After some time, say an hour, filter, wash the residue with ether and dry it at a low temperature say 30–40 degrees centigrade. After being ground and sifted, the product forms a white, odorless and tasteless, well keeping powder, containing about 6.5 per cent. of guaiacol-sulfonic-acid salts.

The strength of the 25 per cent. solution of guaiacol-sulfonic-acid-salts used under Examples 1 and 2 may be varied within certain limits. It is necessary however, that 5–7 parts by weight of the basic sodium salts of the guaiacol-sulfonic-acids, figured as dry, should be used for one hundred parts by weight of the casein, above mentioned, in order to obtain soluble products.

Instead of the basic sodium salts of the guaiacol-sulfonic-acids any other mixtures of basic soluble salts of the guaiacol-sulfonic-acids such as lithium salts or potassium salts may be used. In order to obtain those products it is only necessary to substitute the basic sodium salts of the guaiacol-sulfonic-acids of Examples 1 and 2 by the corresponding basic sulfonic-acid-salts.

The suspension of the casein in the liquid under Example 1 may be effected by any other indifferent organic liquid besides ether-alcohol, in which the albuminoids and the guaiacol-sulfonic-acid-salts are insoluble, such as methylic spirit, acetone, etc.

I claim:

1. The process of manufacturing albumen preparations soluble in water from albuminoids such as albuminates, casein of milk or vegetable casein and basic soluble salts of guaiacol-sulfonic-acids consisting in combining said albuminoids with concentrated solutions of the basic sodium salts of the guaiacol-sulfonic-acids, substantially as set forth.

2. The process of manufacturing albumen preparations soluble in water, from albuminoids such as albuminates, casein of milk or vegetable casein and basic soluble salts of guaiacol-sulfonic-acids consisting in suspending the albuminoids in inactive liquids and mixing to them basic soluble salts of guaiacol-sulfonic-acids, then removing the inactive liquid by filtration and drying the product, substantially as set forth.

3. As a new article of manufacture the above described water soluble product obtained by combining albuminoids such as albuminates, casein of milk or vegetable casein and basic soluble salts of guaiacol-sulfonic-acids in form of a powder white in color, odorless and tasteless, absorbing cold water and swelling up and dissolving by heat to a milky white liquor, substantially as described.

Signed by me at Brunswick, Germany, this 13th day of December, 1909.

ALBERT BUSCH.

Witnesses:
  Dr. Borsum,
  Julius Seckel.